United States Patent
Lee (10) Patent No.: US 10,556,565 B2
(45) Date of Patent: Feb. 11, 2020

(54) CURTAIN AIRBAG APPARATUS

(71) Applicant: HYUNDAI MOBIS CO., LTD., Seoul (KR)

(72) Inventor: Jong Seob Lee, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 34 days.

(21) Appl. No.: 15/688,014

(22) Filed: Aug. 28, 2017

(65) Prior Publication Data

US 2018/0065588 A1  Mar. 8, 2018

(30) Foreign Application Priority Data

Sep. 5, 2016  (KR) .......................... 10-2016-0113671

(51) Int. Cl.
*B60R 21/232* (2011.01)
*B60R 21/213* (2011.01)
*B60R 21/2346* (2011.01)
*B60R 21/233* (2006.01)

(52) U.S. Cl.
CPC .......... *B60R 21/232* (2013.01); *B60R 21/213* (2013.01); *B60R 21/2346* (2013.01); *B60R 2021/23308* (2013.01)

(58) Field of Classification Search
CPC . B60R 21/232; B60R 21/233; B60R 21/2334; B60R 21/213; B60R 21/2346; B60R 2021/23308
USPC ...................................................... 280/728.2
See application file for complete search history.

(56) References Cited

U.S. PATENT DOCUMENTS

| | | | | |
|---|---|---|---|---|
| 5,667,241 A * | 9/1997 | Bunker | ................. | B60R 21/201 280/730.2 |
| 6,254,123 B1 * | 7/2001 | Urushi | ................. | B60R 21/213 280/730.2 |
| 6,328,333 B1 * | 12/2001 | Patel | ....................... | B60R 21/04 280/730.1 |
| 6,386,581 B1 * | 5/2002 | Ohno | .................... | B60R 21/013 180/282 |
| 6,409,210 B1 * | 6/2002 | Emerling | ............ | B60R 13/0212 280/730.2 |
| 6,530,594 B1 * | 3/2003 | Nakajima | ............. | B60R 21/213 280/728.2 |
| 6,588,793 B2 * | 7/2003 | Rose | ................... | B60R 21/2171 280/728.2 |
| 6,616,178 B1 * | 9/2003 | Nanbu | .................. | B60R 21/232 280/730.2 |
| 7,213,837 B2 * | 5/2007 | Clarke | .................... | B60R 21/20 280/731 |

(Continued)

FOREIGN PATENT DOCUMENTS

JP       2014015104 A  *  1/2014

*Primary Examiner* — Ruth Ilan
*Assistant Examiner* — Hilary L Johns
(74) *Attorney, Agent, or Firm* — Knobbe Martens Olson & Bear LLP (57) ABSTRACT

A curtain airbag apparatus may include: an inflator part configured to inject gas; a main cushion part expanded by the gas injected from the inflator part, and coupled to a car body; and a cushion moving part interposed between the main cushion part and the car body, and expanded by the gas injected from the inflator part so as to move the main cushion part. The gas transferred to the cushion moving part may be passed through the cushion moving part and transferred to the main cushion part.

6 Claims, 9 Drawing Sheets

(56) References Cited

U.S. PATENT DOCUMENTS

| | | | | |
|---|---|---|---|---|
| 7,380,815 B2* | 6/2008 | Rose | B60R 21/213 | 280/728.2 |
| 7,390,016 B2* | 6/2008 | Noguchi | B60R 21/232 | 280/730.2 |
| 7,584,988 B2* | 9/2009 | Okamoto | B60R 21/36 | 180/274 |
| 7,618,057 B2* | 11/2009 | Pinsenschaum | B60R 21/232 | 280/729 |
| 7,673,897 B2* | 3/2010 | Ochiai | B60R 21/213 | 280/728.2 |
| 7,695,004 B2* | 4/2010 | Inoue | B60R 21/207 | 280/730.2 |
| 7,878,538 B2* | 2/2011 | Abe | B60R 21/2338 | 280/736 |
| 7,963,550 B2* | 6/2011 | Hong | B60R 21/206 | 280/729 |
| 7,967,098 B2* | 6/2011 | Choi | B60R 21/36 | 180/274 |
| 8,308,192 B2* | 11/2012 | Konishi | B60R 21/213 | 280/730.2 |
| 8,636,301 B1* | 1/2014 | Wang | B60R 21/232 | 280/730.2 |
| 8,876,153 B2* | 11/2014 | Dix | B60R 21/233 | 280/729 |
| 10,207,669 B2* | 2/2019 | Konaka | B60R 21/213 | |
| 2003/0116947 A1* | 6/2003 | Yokoyama | B60R 21/201 | 280/730.2 |
| 2005/0242551 A1* | 11/2005 | Noguchi | B60R 21/232 | 280/730.2 |
| 2010/0084841 A1* | 4/2010 | Suemitsu | B60R 21/2346 | 280/730.2 |
| 2012/0267880 A1* | 10/2012 | Frisk | B60R 21/232 | 280/730.2 |
| 2012/0286499 A1* | 11/2012 | Wiik | B60R 21/213 | 280/730.2 |
| 2013/0087999 A1* | 4/2013 | Konishi | B60R 21/201 | 280/743.1 |

* cited by examiner

CURTAIN AIRBAG APPARATUS

CROSS-REFERENCES TO RELATED APPLICATIONS

The present application claims priority to Korean application number 10-2016-0113671, filed on Sep. 5, 2016, which is incorporated by reference in its entirety.

BACKGROUND OF THE INVENTION

The present invention relates to a curtain airbag apparatus, and more particularly, to a curtain airbag apparatus which is expanded in case of an emergency such as a collision or overturn of a vehicle and protects a passenger's body.

An airbag apparatus for a car refers to a safety device that reduces a shock applied to a passenger by expanding a cushion when a collision accident occurs. The airbag apparatus may be divided into a DAB (Driver Air Bag), PAB (Passenger Air Bag), SAB (Side Air Bag) and CAB (Curtain Air Bag).

In particular, the curtain airbag apparatus which is expanded from the side top of a passenger is mounted in the roof of a car body. The curtain airbag apparatus is expanded downward in case of an emergency, and restricts the head and upper body of the passenger, thereby preventing a bodily injury of the passenger.

However, the conventional curtain airbag apparatus may interfere with a surrounding structure, specifically, a pillar trim. When a guide and the like are added to prevent the interference, the numbers of assembly processes and parts and the weight of the apparatus may be increased, and the expansion performance of the cushion may be degraded. Therefore, there is a demand for a structure capable of solving the problem.

The related art of the present invention is disclosed in Korean Patent Publication No. 10-2016-0025370 published on Mar. 8, 2016 and entitled "Curtain airbag for car".

SUMMARY OF THE INVENTION

Embodiments of the present invention are directed to a curtain airbag apparatus which is capable of preventing an interference with a surrounding structure such as a pillar trim or the like, reducing the numbers of parts and assembling processes, and lowering the weight and cost thereof.

In one embodiment, a curtain airbag apparatus may include: an inflator part configured to inject gas; a main cushion part expanded by the gas injected from the inflator part, and coupled to a car body; and a cushion moving part interposed between the main cushion part and the car body, and expanded by the gas injected from the inflator part so as to move the main cushion part. The gas transferred to the cushion moving part may be passed through the cushion moving part and transferred to the main cushion part.

The main cushion part may include: a main cushion having a gas injection hole into which the inflator part is injected, and expanded by the gas injected from the inflator part; and a cushion mounting part connecting the main cushion and the car body, wherein the cushion moving part is located between the cushion mounting part and the car body.

The cushion mounting part may include: a cushion mounting guide being in contact with the main cushion, wherein the cushion moving part is positioned between the cushion mounting guide and the car body; and a mounting tab coupling the main cushion to the cushion mounting guide. The cushion mounting guide may be deformed by the cushion moving part when the cushion moving part is expanded, and change the location or expansion direction of the main cushion part.

The main cushion part may further include a gas transfer guide part located in the gas injection hole, and guiding a transfer of the gas injected from the inflator part toward the cushion moving part.

The gas transfer guide part may include: a guide cushion installed in the main cushion; a guide injection part installed in the guide cushion and having the inflator part inserted therein; and a gas transfer part installed in the guide cushion, and opened toward the cushion moving part so as to transfer gas introduced into the guide cushion to the cushion moving part.

The gas transfer guide part may further include a gas guide hole for guiding the gas introduced into the guide cushion to a predetermined location of the main cushion.

The cushion moving part may include: a gas injection part into which the gas injected from the inflator part is introduced; a moving expansion part connected to the gas injection part, expanded by the gas received from the gas injection part, and pressing and moving the main cushion part; and a gas discharge part connecting the moving expansion part and the main cushion part, and transferring the gas received from the moving expansion part to the main cushion part.

The cushion moving part and the main cushion part may be formed as one body.

The cushion moving part and the main cushion part may be formed by sewing a pair of panels, and distinguished from each other by an expansion section part formed through a process of sewing the pair of panels in the longitudinal direction of the car body.

The cushion moving part may be located above a pillar trim.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
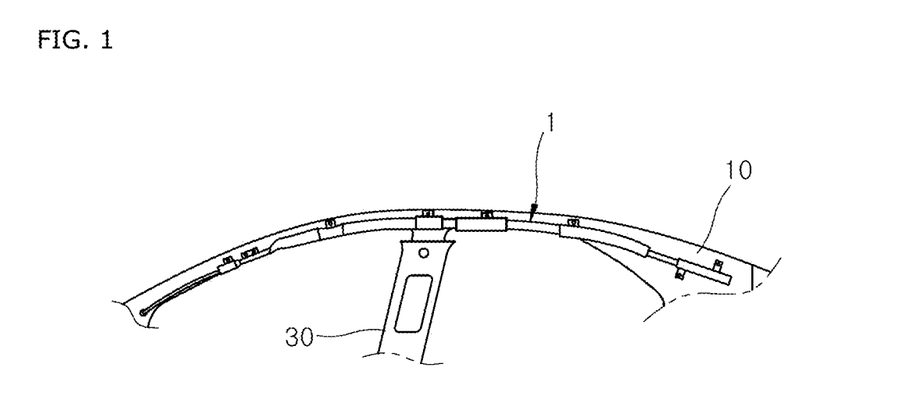
FIG. 1 is a schematic front view of a curtain airbag apparatus in accordance with an embodiment of the present invention.
Figure 2:
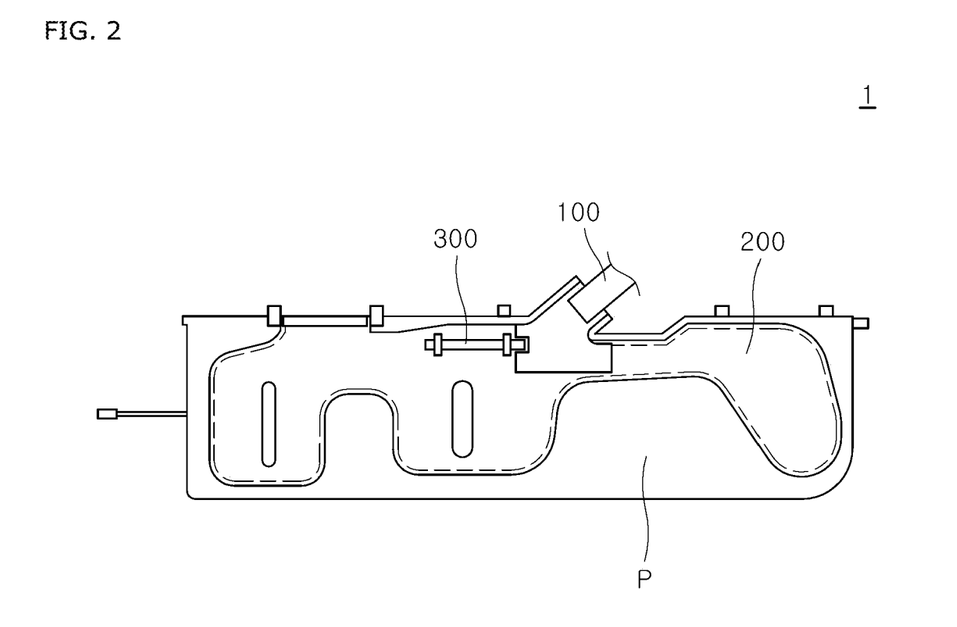
FIG. 2 illustrates that a main cushion part and a cushion moving part of the curtain airbag apparatus in accordance with the embodiment of the present invention are deployed.
Figure 3:
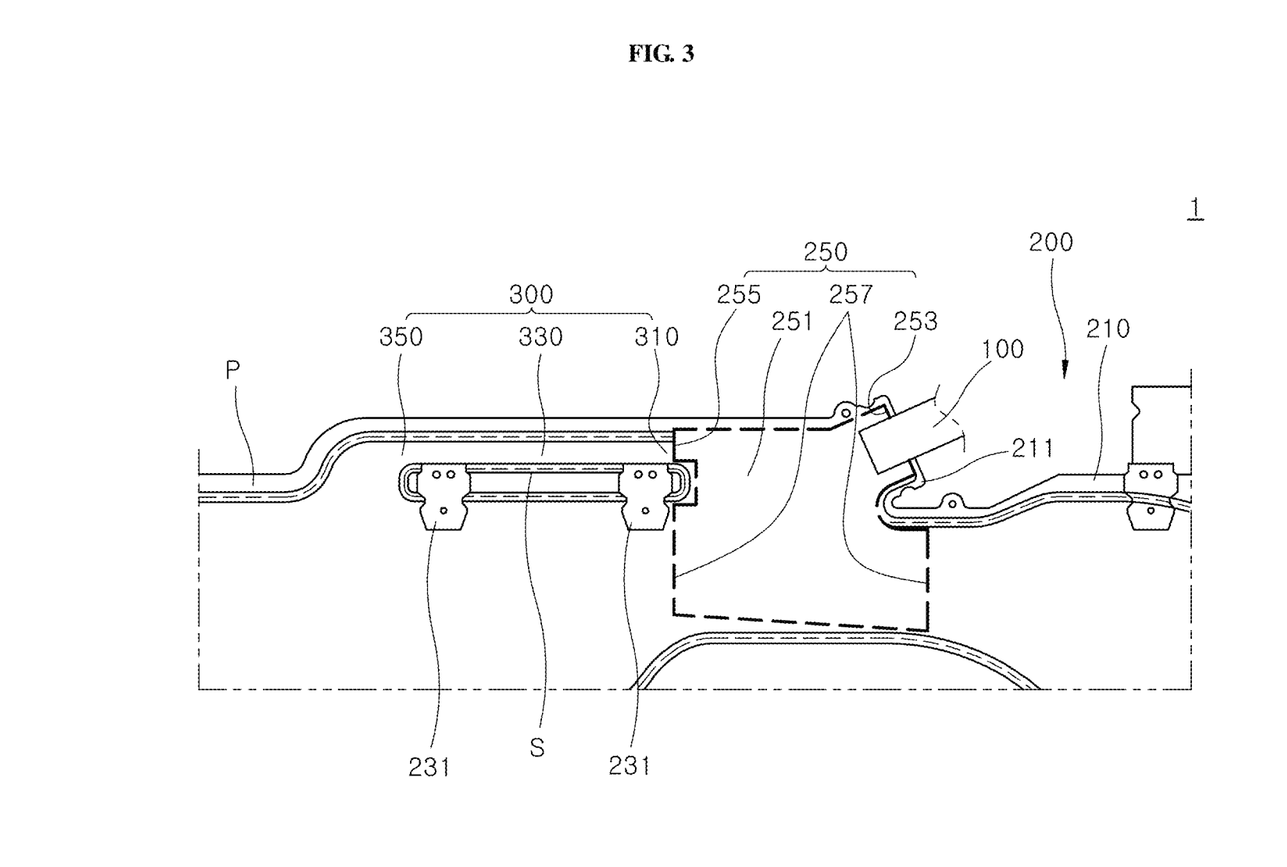
FIG. 3 illustrates the locations of an inflator part, the main cushion part and the cushion moving part in the curtain airbag apparatus in accordance with the embodiment of the present invention.
Figure 4:
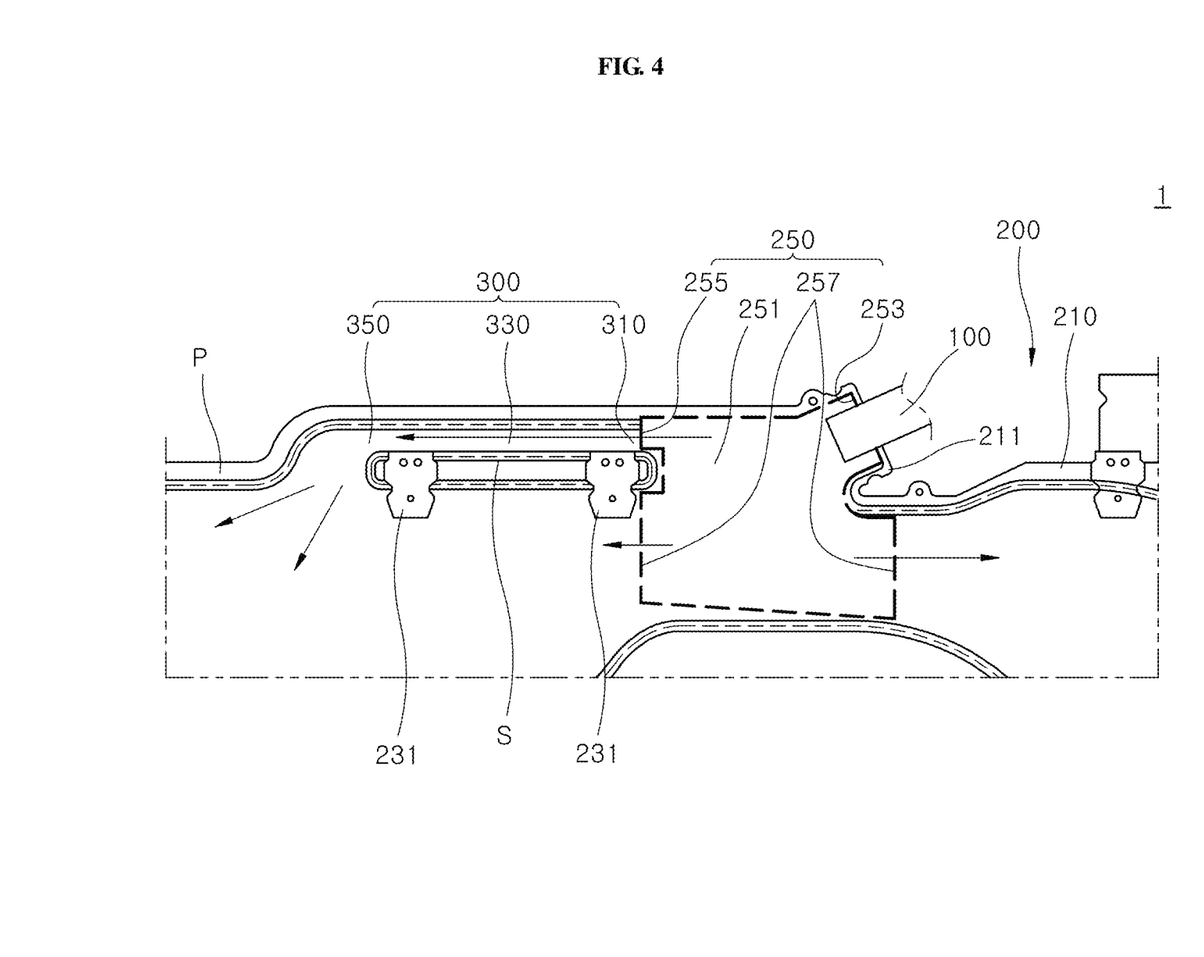
FIG. 4 illustrates a transfer path of gas in FIG. 3.

FIG. 1 is a schematic front view of a curtain airbag apparatus in accordance with an embodiment of the present invention, FIG. 2 illustrates that a main cushion part and a cushion moving part of the curtain airbag apparatus in accordance with the embodiment of the present invention are deployed, FIG. 3 illustrates the locations of an inflator part, the main cushion part and the cushion moving part in the curtain airbag apparatus in accordance with the embodiment of the present invention, and FIG. 4 illustrates a transfer path of gas in FIG. 3.

Referring to FIGS. 1 to 4, the curtain airbag apparatus 1 in accordance with the present embodiment may include an inflator part 100, a main cushion part 200 and a cushion moving part 300. In case of an emergency such as a vehicle collision, the curtain airbag apparatus 1 may be expanded to protect a passenger.

The inflator part 100 may inject gas. The inflator part 100 in accordance with the present embodiment may be installed in the roof of a car body 10, and inject gas to expand the main cushion part 200 and the cushion moving part 300 in case of an emergency such as a collision and overturn of the car.

In the present embodiment, the inflator part 100 may include an igniter (not illustrated). As the igniter generates gas by igniting powder according to a collision detection signal, the inflator part 100 may rapidly inject the gas into the main cushion part 200 or the cushion moving part 300.

The main cushion part 200 may be expanded by the gas injected from the inflator part 100, and coupled to the car body 10. In the present embodiment, the main cushion part 200 may include a main cushion 210 and a cushion mounting part 230.

The main cushion 210 has a gas injection hole 211 into which the inflator part 100 is inserted. When the gas injected from the inflator part 100 is introduced into the main cushion 210, the main cushion 210 may be expanded downward while the internal pressure of the main cushion 210 is raised, thereby protecting the upper body of the passenger, specifically, the head of the passenger.

Figure 5:
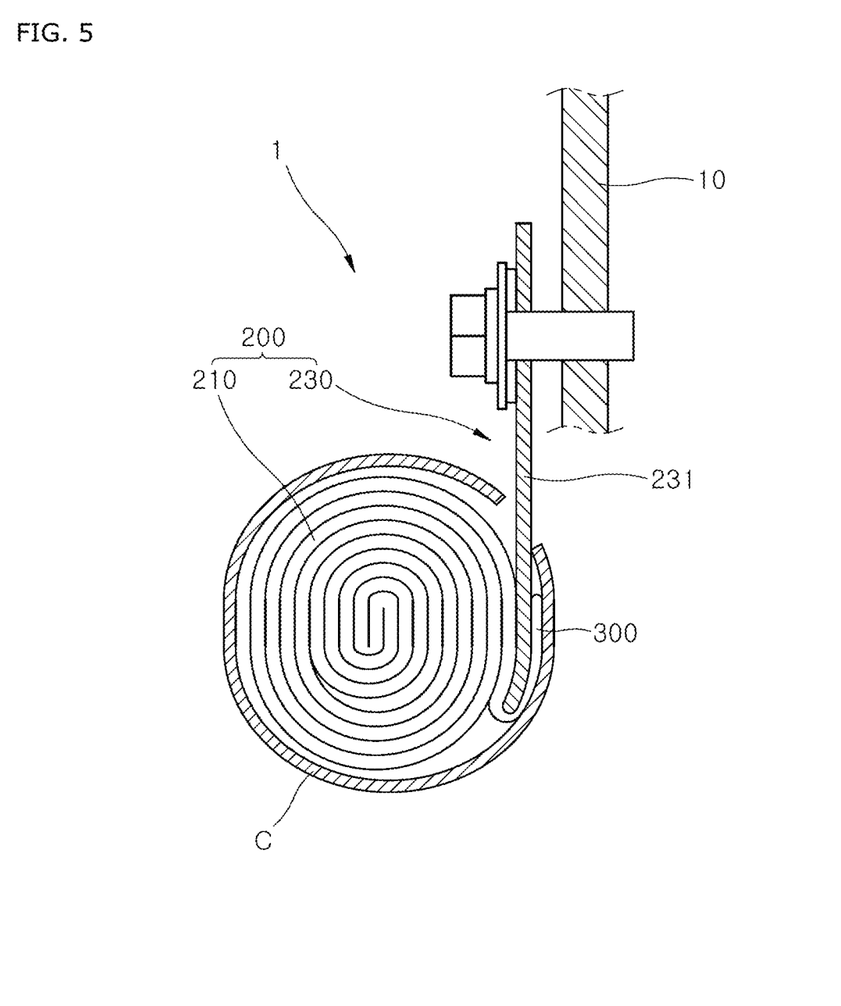
FIG. 5 illustrates that the main cushion part and the cushion moving part of the curtain airbag apparatus in accordance with the embodiment of the present invention are folded.
Figure 6:
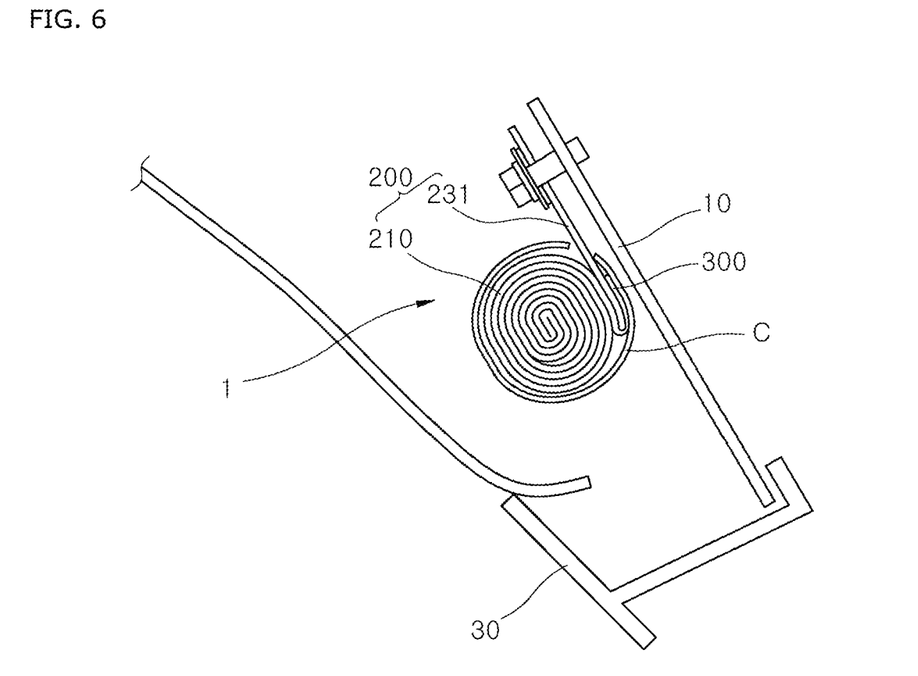
FIG. 6 illustrates that the curtain airbag apparatus in accordance with the embodiment of the present invention is coupled to a car body.
Figure 7:
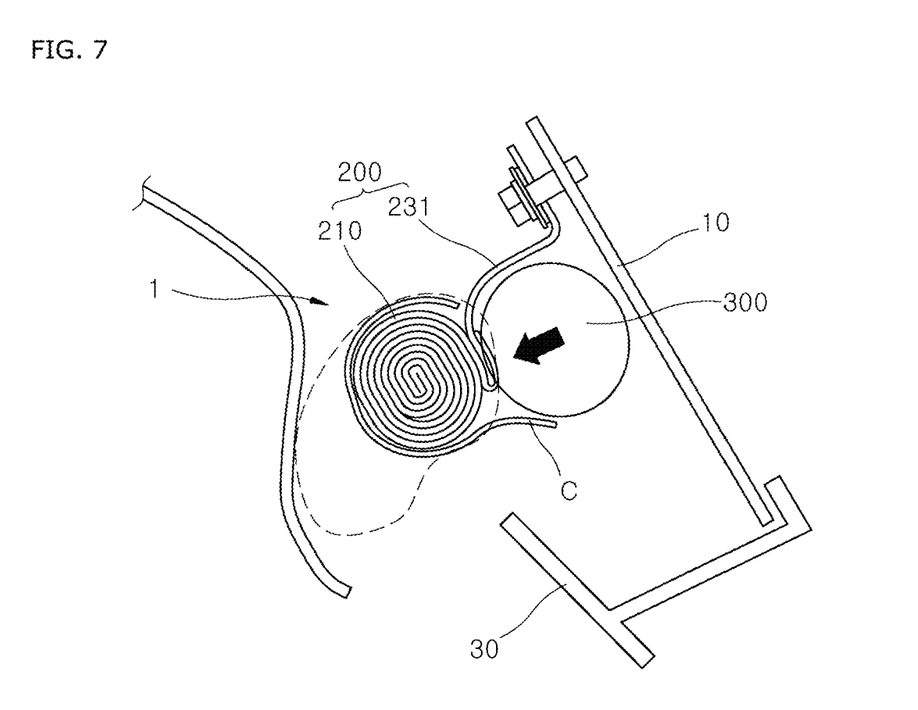
FIG. 7 illustrates that the cushion moving part moves the main cushion part in the curtain airbag apparatus in accordance with the embodiment of the present invention.
Figure 8:
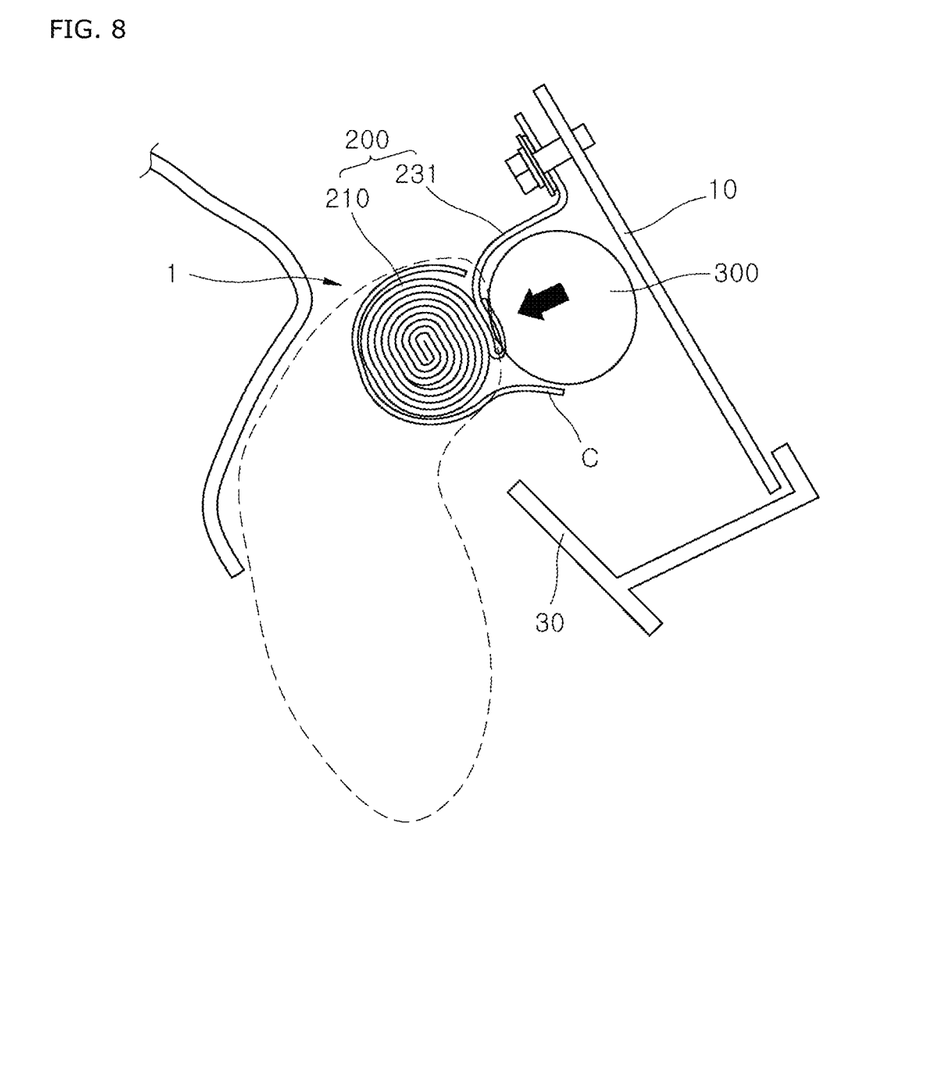
FIG. 8 illustrates that the cushion moving part and the main cushion part are expanded in the curtain airbag apparatus in accordance with the embodiment of the present invention.

FIG. 5 illustrates that the main cushion part and the cushion moving part of the curtain airbag apparatus in accordance with the embodiment of the present invention are folded, FIG. 6 illustrates that the curtain airbag apparatus in accordance with the embodiment of the present invention is coupled to a car body, FIG. 7 illustrates that the cushion moving part moves the main cushion part in the curtain airbag apparatus in accordance with the embodiment of the present invention, and FIG. 8 illustrates that the cushion moving part and the main cushion part are expanded in the curtain airbag apparatus in accordance with the embodiment of the present invention.

Referring to FIGS. 3 to 8, the cushion mounting part 230 may connect the main cushion 210 and the car body 10, and the cushion moving part 300 may be located between the car body 10 and the cushion mounting part 230. In the present embodiment, the cushion mounting part 230 may include a cushion mounting guide 231 and a mounting tab 233.

The mounting tab 233 may include a rivet or bolt, and couple the main cushion 210 to the cushion mounting guide 231 in order to prevent a separation of the main cushion 210 from the cushion mounting guide 231.

The mounting tab 233 may include a rivet or bolt, and couple the main cushion 210 to the cushion mounting guide 231 in order to prevent a separation of the main cushion 210 from the cushion mounting guide 231.

The mounting tab 233 may include a rivet or bolt, and couple the main cushion 210 to the cushion mounting guide 231 in order to prevent a separation of the main cushion 210 from the cushion mounting guide 231.

In the present embodiment, the cushion mounting guide 231 may be made of metal or synthetic resin. When the cushion moving part 300 is expanded, the cushion mounting guide 231 may be bent by the expansion force of the cushion moving part 300, and change the expansion direction of the main cushion 210 such that the pillar trim 30 or the like does not interfere with the main cushion 210.

That is, before the main cushion 210 is expanded, the cushion mounting guide 231 may be located adjacent to the car body 10, thereby preventing the main cushion 210 from protruding to the inside of the car body 10 while reducing the mounting space of the curtain airbag apparatus 1.

When the main cushion 210 is expanded, the cushion mounting guide 231 may be bent toward the widthwise center of the car body 10 by the cushion moving part 300, thereby preventing an interference between the main cushion 210 and the pillar trim 30 or the like.

In the present embodiment, the main cushion part 200 may further include a gas transfer guide part 250. The gas transfer guide part 250 may be located in the gas injection hole 211, and guide a transfer of gas injected by the inflator part 100 toward the cushion moving part 300. In the present embodiment, the gas transfer guide part 250 may include a guide cushion 251, a guide injection part 253 and a gas transfer part 255.

The guide cushion 251 may be coupled to the inside of the main cushion 210, specifically, the inner circumferential surface of the gas injection hole 211 through sewing or bonding, prevent a damage of the main cushion 210 by the gas injected from the inflator part 100, and guide the gas injected from the inflator part 100 such that the gas is transferred into the main cushion 210 or the cushion moving part 300.

The guide injection part 253 may be installed in the guide cushion 251, and the inflator part 100 may be inserted into the guide injection part 253 so as to transfer the gas injected from the inflator part 100 into the guide cushion 251. The guide injection part 253 may be formed in a shape to open one side of the guide cushion 251, such that an injection nozzle of the inflator part 100 can enter the guide cushion 251.

The gas transfer part 255 may be formed in the guide cushion 251, and opened toward the cushion moving part 300 so as to transfer the gas introduced into the guide cushion 251 to the cushion moving part 300.

In the present embodiment, the cushion moving part 300 may be formed in a shape to open the other side of the guide cushion 251, and the gas transfer part 255 may be opened toward the cushion moving part 300 while being directly connected to the cushion moving part 300 or separated from the cushion moving part 300, and guide a transfer of gas such that the gas in the guide cushion 251 is transferred to the cushion moving part 300.

The gas transfer guide part 250 may further include a gas guide hole 257 to guide the gas introduced into the guide cushion 251 to a predetermined location of the main cushion 210, in addition to the guide injection part 253 and the gas transfer part 255.

The locations, numbers and diameters of the guide injection part 253, the gas transfer part 255 and the gas guide hole 257 may be adjusted depending on locations where the guide injection part 253, the gas transfer part 255 and the gas guide hole 257 are mounted in the car body 10, the shape of the main cushion part 200 or the cushion moving part 300, and the target expansion time.

The cushion moving part 300 may be interposed between the main cushion part 200 and the car body 10, and expanded by the gas injected from the inflator part 100 so as to move the main cushion part 200 toward one side.

In the present embodiment, the gas transferred to the cushion moving part 300 may be transferred to the main cushion part 200 through the cushion moving part 300, after expanding the cushion moving part 300. The cushion moving part 300 may include a gas injection part 310, a moving expansion part 330 and a gas discharge part 350.

The gas injected from the inflator part 100 may be introduced into the gas injection part 310. In the present embodiment, the gas injection part 310 may be connected to the moving expansion part 330, and opened toward the inflator part 100 so as to introduce the gas injected from the inflator part 100 into the moving expansion part 330.

The moving expansion part 330 may be connected to the gas injection part 310, expanded by the gas transferred from the gas injection part 310, and press and move the main cushion part 200.

In the present embodiment, the moving expansion part 330 may be elongated in the longitudinal direction of the car body 10, and guide a transfer of gas received from the inflator part 100 to the back from the front of the car body 10 or to the front from the back of the car body 10.

In the present embodiment, the moving expansion part 330 may be connected to one end portion of the main cushion 210, specifically, an upper end portion of the main cushion 210, and interposed between the cushion mounting part 230 and the car body 10 while the connection between the moving expansion part 330 and the main cushion 210 is bent.

In the present embodiment, the moving expansion part 330 may be made of the same material as the main cushion 210, and expanded by the gas injected from the inflator part 100 so as to press and move the main cushion 210 toward one side, for example, the longitudinal center of the car body 10.

The gas discharge part 350 may connect the moving expansion part 330 and the main cushion part 200, and transfer the gas received from the moving expansion part 330 to the main cushion part 200. In the present embodiment, the gas discharge part 350 may be located at the opposite side of the gas injection part 310 based on the moving expansion part 330, such that the gas introduced into the moving expansion part 330 through the gas injection part 310 is discharged to the gas discharge part 350 through the moving expansion part 330.

The gas discharge part 350 may be connected to the inside of the main cushion 210, and introduce the gas passed through the moving expansion part 330 into the main cushion 210.

Thus, in the curtain airbag apparatus 1 in accordance with the present embodiment, the moving expansion part 330 may be expanded to move the main cushion part 200, thereby preventing an interference with the pillar trim 30 or the like when the main cushion part 200 is expanded.

Furthermore, since the gas supplied from the inflator part 100 is transferred toward the main cushion 210 through the moving expansion part 330, the high-pressure gas may be rapidly transferred to a predetermined location of the main cushion 210, in order to set the expansion speed and expansion sequence of the main cushion 210.

In the present embodiment, the cushion moving part 300 may be integrated with the main cushion part 200 through a process of sewing a pair of panels P. That is, since the cushion moving part 300 and the main cushion part 200 are not formed as separate parts and the main cushion part 200 and the cushion moving part 300 are formed as one body through the process of sewing the pair of panels P, the structure for applying the cushion moving part 300 is simple and easy to mount.

In the present embodiment, the main cushion part 200 and the cushion moving part 300 may be distinguished from each other by an expansion section part S formed through the process of sewing the pair of panels P in the longitudinal direction of the car body 10.

In the present embodiment, the cushion moving part 300 may be positioned above the pillar trim 30, and separate the main cushion 210 from the location where the main cushion part 200 is mounted when the main cushion part 200 is expanded, thereby preventing the main cushion 210 from being locked to the upper end portion of the pillar trim 30.

Hereafter, the operation principle and effect of the curtain airbag apparatus 1 in accordance with the embodiment of the present invention will be described as follows.

The main cushion 210 may be coupled to the car body 10 by the cushion mounting part 230. The main cushion 210 may be folded and mounted in the cushion mounting part 230, or folded after being mounted in the cushion mounting part 230. The spec of the car body 10 and the shape of the main cushion 210 may decide when to fold the main cushion 210.

The connection portion between the cushion moving part 300 and the main cushion 210 may be located at the lower end of the cushion mounting part 230, such that the cushion moving part 300 is folded to be in contact with the other surface of the cushion mounting part 230. The cushion moving part 300 may be fixed to the car body 10, the cushion mounting part 230 or the main cushion 210 through a paper tape or cushion cover C.

After the main cushion 210 is folded, the cushion moving part 300 may be folded into the rear side of the cushion mounting part 230, that is, the space between the cushion mounting part 230 and the car body 10, and then fixed through a paper tape or cushion cover C. Even before the main cushion 210 is folded, the cushion mounting part 230 may be located at the rear side of the cushion mounting part 230, and fixed through a paper tape or the like. Then, the main cushion 210 may be folded.

When a collision or overturn of the car occurs, the collision or overturn may be sensed through a measurement sensor. When an airbag injection signal is inputted, the inflator part 100 may inject gas into the main cushion 210 or the cushion mounting part 230.

That is, the gas injected from the inflator part 100 may be transferred to the cushion mounting part 230 and the main cushion 210 through the gas injection hole 211 and the gas transfer guide part 250, and expand the cushion mounting part 230 and the main cushion 210.

The cushion moving part 300 may receive the gas injected from the inflator part 100 through the gas injection part 310, and the gas inputted to the gas injection part 310 may be passed through the moving expansion part 330 while expanding the moving expansion part 330, and discharged to the gas discharge part 350. The gas discharged to the gas discharge part 350 may be transferred to a predetermined location of the main cushion 210 and expand the main cushion 210.

Since the cushion moving part 300 is formed in a pipe shape in which the gas injection part 310, the moving expansion part 330 and the gas discharge part 350 are sequentially connected, the cushion moving part 300 may expand the main cushion 210 such that the gas passed through the cushion moving part 300 can rapidly reach a predetermined location of the main cushion 210, for example, a protection region which comes in contact with the head or the like of a passenger.

Furthermore, since the cushion moving part 300 is expanded while being located between the cushion mounting part 230 and the car body 10, the cushion moving part 300 may move the main cushion 210 and the cushion mounting part 230 in the direction away from the inner wall of the car body 10, thereby changing the expansion direction of the main cushion 210.

Figure 9:
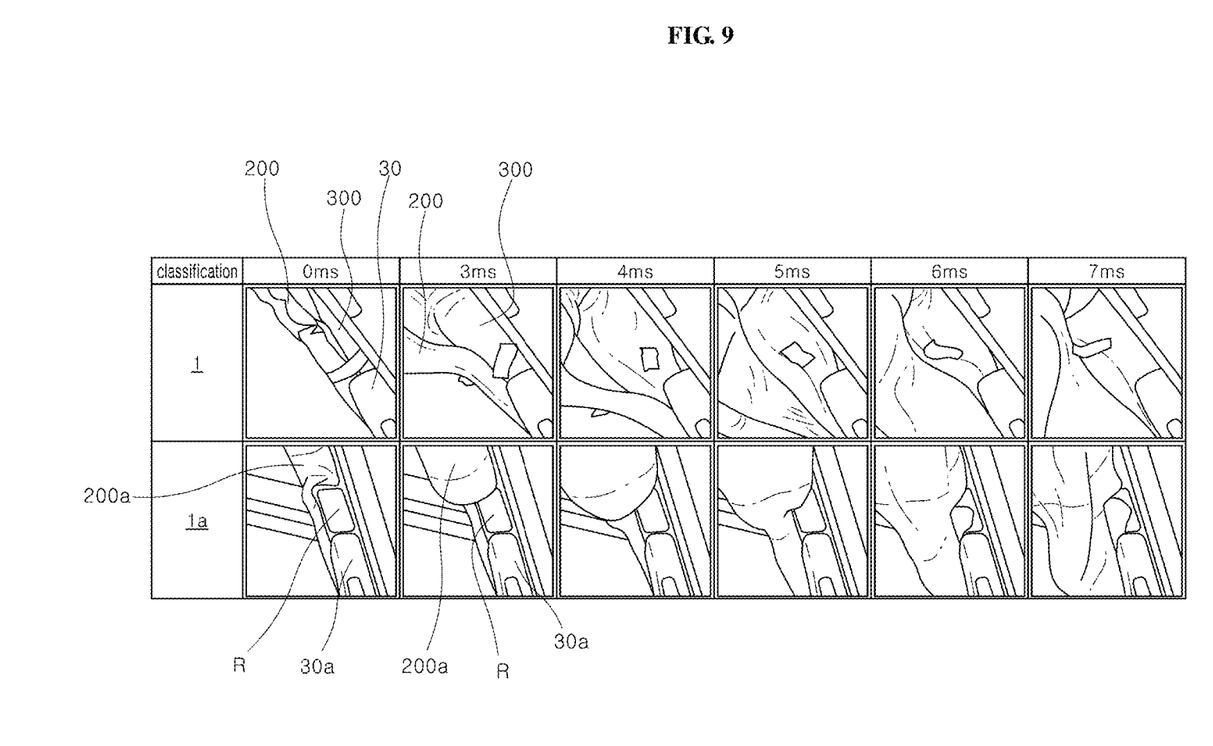
FIG. 9 shows time-based states that the curtain airbag apparatus in accordance with the embodiment of the present invention and the conventional curtain airbag apparatus are expanded.

FIG. 9 shows time-based states that the curtain airbag apparatus in accordance with the embodiment of the present invention and the conventional curtain airbag apparatus are expanded.

Referring to FIG. 9, the curtain airbag apparatus 1 in accordance with the present embodiment, to which the cushion moving part 300 is applied, may be fixed to the main cushion 210 through a paper table or the like (refer to reference numeral 1 of FIG. 9).

In the conventional curtain airbag apparatus 1a, a ramp R may be mounted between the main cushion part 200a and the pillar trim 30a, and limit the expansion direction of the main cushion part 200a (refer to reference numeral 1a of FIG. 9).

Referring to FIG. 9, the cushion moving part 300 in accordance with the present embodiment can be expanded to push the main cushion part 200, thereby preventing interference between the main cushion part 200 and the pillar trim 30. Furthermore, since the main cushion part 200 is expanded without an interference of the ramp R, the expansion performance can be improved in comparison to the conventional curtain airbag apparatus 1a.

In the present embodiment, the cushion moving part 300 may be positioned above the pillar trim 30. Thus, when the main cushion 210 is expanded, the cushion moving part 300 may change the expansion direction of the main cushion 210 such that the pillar trim 30 does not interfere with the main cushion 210.

Therefore, when the main cushion 210 is folded, the main cushion 210 may be placed against the inner wall of the car body 10 so as to reduce the mounting space. Furthermore, when the main cushion 210 is expanded, the main cushion 210 may be separated from the inner wall of the car body 10, thereby preventing an interference with the pillar trim 30.

Thus, the curtain airbag apparatus 1 in accordance with the present embodiment can rapidly expand the predetermined location of the main cushion 210 so as to prevent a bodily injury of a passenger. Furthermore, when the main cushion 210 is expanded, the curtain airbag apparatus 1 can prevent an interference between the main cushion 210 and a surrounding structure such as the pillar trim 30, thereby stably operating the airbag.

Furthermore, the curtain airbag apparatus 1 can be applied through a simple configuration without an addition of parts, reduce the numbers of parts and assembling processes by replacing a cushion deployment guide (ramp), and reduce the weight and manufacturing cost thereof, thereby improving the productivity.

In accordance with the embodiment of the present invention, the curtain airbag apparatus may press and move the main cushion part using the cushion moving unit and changes the location and direction where the main cushion part is deployed. Thus, when the main cushion part is deployed, the curtain airbag apparatus can prevent an interference with the pillar trim or the like.

Furthermore, since the cushion moving part rapidly transfers gas to a predetermined location of the main cushion part, the curtain airbag apparatus can rapidly protect a passenger.

Furthermore, since the curtain airbag apparatus can be implemented through a simple configuration without an addition of parts, a cushion deployment guide (ramp) can be replaced to reduce the numbers of parts and assembling processes, and the weight and manufacturing cost can be reduced to improve the productivity.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. A curtain airbag apparatus of a vehicle comprising:
an inflator part configured to generate gas in response to a collision;
an airbag connected to the inflator part and configured to inflate using the gas from the inflator part, wherein the airbag comprises a main cushion part and a secondary cushion part; and
a cushion mounting guide coupled to a vehicle body, wherein the cushion mounting guide extends between a first end and a second end, wherein the first end is fixed to the vehicle body and the second end is coupled to the airbag,
wherein, in a folded state of the airbag, the secondary cushion part is located on one side of the cushion mounting guide and the main cushion part is disposed on the other side of the cushion mounting guide such that the second end of the cushion mounting guide is interposed between the secondary cushion part and the main cushion part and further such that the secondary cushion part is located between the vehicle body and the cushion mounting guide,
wherein, when the airbag inflates, the secondary cushion part is configured to inflate between the cushion mounting guide and the vehicle body to push the second end of the cushion mounting guide and the main cushion part away from the vehicle body, and the main cushion part is configured to inflate in a state that the main cushion part has moved away from the vehicle body.

2. The curtain airbag apparatus of claim 1, wherein the airbag comprises a gas transfer guide part configured to guide the gas from the inflator part to the secondary cushion part.

3. The curtain airbag apparatus of claim 2, wherein the gas transfer guide part comprises:
- a guide cushion installed in the airbag;
- a guide injection part installed in the guide cushion and having the inflator part inserted therein; and
- a gas transfer part installed in the guide cushion, and opened toward the secondary cushion part so as to transfer the gas introduced into the guide cushion to the secondary cushion part.

4. The curtain airbag apparatus of claim 3, wherein the gas transfer guide part further comprises a gas guide hole for guiding the gas introduced into the guide cushion to a predetermined location of the main cushion part.

5. The curtain airbag apparatus of claim 1, wherein the secondary cushion part is located above a pillar trim.

6. The curtain airbag apparatus of claim 1, wherein when inflating the secondary cushion part, the cushion mounting guide is to be deformed such that the second end moves away from the vehicle body while the first end is fixed to the vehicle body.

* * * * *